Patented Sept. 19, 1944

2,358,337

UNITED STATES PATENT OFFICE 2,358,337

VITAMIN INTERMEDIATES AND THEIR PREPARATION

Elmer J. Lawson, Newtonville, N. Y., and Hervey C. Parke and Leon A. Sweet, Detroit, Mich., assignors to Parke, Davis & Company, Detroit, Mich., a corporation of Michigan No Drawing. Original application January 4, 1941, Serial No. 373,193. Divided and this application August 16, 1943, Serial No. 498,872

8 Claims. (Cl. 260—561)

The invention relates to the preparation of $\alpha,\gamma$-dihydroxy-$\beta,\beta$-dimethylbutyramide compounds, and this application is a division of our copending application, Serial No. 373,193, filed January 4, 1941.

The $\alpha,\gamma$-dihydroxy-$\beta,\beta$-dimethylbutyramide compounds of this invention are of great utility as intermediates in the preparation of pantothenic acid compounds. The new amides may very conveniently be prepared from $\alpha$-hydroxy-$\beta,\beta$-dimethyl-$\gamma$-butyrolactone by the action of ammonia. This may be accomplished either by passing ammonia into a solution of the lactone in organic solvents, such as methanol or ethanol, or more conveniently, by reacting the lactone with liquid ammonia and then removing the excess ammonia to obtain the amide.

The invention may be illustrated by the following specific example:

Racemic $\alpha$-hydroxy-$\beta,\beta$-dimethyl-$\gamma$-butyrolactone may be prepared for example as described by Kohn and Neustadter, Monatsh. 39, 293 (1918). The lactone of melting point about 56° as thus obtained is suitable for use without further purification.

75 grams of $\alpha$-hydroxy-$\beta,\beta$-dimethyl-$\gamma$-butyrolactone is dissolved in about 400 cc. of liquid ammonia in an open vessel such as a 2 l. flask. The lactone dissolves immediately in the liquid ammonia with formation of a clear solution.

After standing overnight, all of the ammonia has evaporated to leave a crystalline solid. This solid is triturated with petroleum ether, collected on a funnel and washed several times with petroleum ether. The crude product thus obtained is recrystallized from about ten times as much acetone. As thus obtained, the product, dl-$\alpha,\gamma$-dihydroxy-$\beta,\beta$-dimethylbutyramide, has a melting point of 126–127° C. It is insoluble in petroleum ether and chloroform, somewhat soluble in acetone and quite soluble in alcohol. With aqueous sodium carbonate solution no ammonia is evolved, but with boiling aqueous sodium hydroxide solution ammonia is evolved. This shows that the substance is an amide rather than an ammonium salt. The yield is about 60 grams.

A sample was analyzed with the following results: Calc. for C—49.0%; H—8.90%; N—9.52%; Found, C, 49.4%, 49.38%; H, 9.19%, 9.00%; N, 9.43%, 9.51%.

Instead of using the racemic lactone as above to obtain the racemic amide, one may use either of the optically active forms of the lactone, thereby obtaining the optically active forms of the amide. Thus, the (—)-$\alpha$-hydroxy-$\beta,\beta$-dimethyl-$\gamma$-butyrolactone ($[\alpha]^{25}_D=-50.4°$ in 2% aqueous solution), obtained from the more insoluble quinine salt in the resolution of the dl-lactone, yields the (+)-$\alpha,\gamma$-dihydroxy-$\beta,\beta$-dimethylbutyramide having a melting point of 94° C. and $[\alpha]^{25}_D=+52°$ (in 2% methanolic solution). Similarly, the (+)-$\alpha$-hydroxy-$\beta,\beta$-dimethyl-$\gamma$-butyrolactone ($[\alpha]^{25}_D=$approximately $+50°$ in 2% aqueous solution), obtained from the more soluble quinine salt in the resolution of the dl-lactone, yields the (—)-$\alpha,\gamma$-dihydroxy-$\beta,\beta$-dimethylbutyramide having a melting point of 94° C. and $[\alpha]^{25}_D$ of approximately $-52°$. The optically active amides have, in each case, the same melting point, 94° C., and rotations of the same magnitude, but opposite sign.

The new compounds of this invention may be reacted with the alkali metal salts of $\beta$-alanine or with esters such as the methyl ester or ethyl ester of $\beta,\beta$-alanine, thereby producing compounds of pantothenic acid as described and claimed in our application, Serial No. 373,193 above referred to.

What we claim as our invention is:

1. The process which comprises treating $\alpha$-hydroxy-$\beta,\beta$-dimethyl-$\gamma$-butyrolactone with ammonia to form $\alpha,\gamma$-dihydroxy-$\beta,\beta$-dimethylbutyramide.

2. The process which comprises reacting $\alpha$-hydroxy-$\beta,\beta$-dimethyl-$\gamma$-butyrolactone with liquid ammonia to form $\alpha,\gamma$-dihydroxy-$\beta,\beta$-dimethylbutyramide.

3. The process which comprises treating racemic $\alpha$-hydroxy-$\beta,\beta$-dimethyl-$\gamma$-butyrolactone with ammonia to form dl-$\alpha,\gamma$-dihydroxy-$\beta,\beta$-dimethylbutyramide.

4. The process which comprises treating (—)-$\alpha$-hydroxy-$\beta,\beta$-dimethyl-$\gamma$-butyrolactone with ammonia to form (+)-$\alpha,\gamma$-dihydroxy-$\beta,\beta$-dimethylbutyramide.

5. The process which comprises treating (+)-$\alpha$-hydroxy-$\beta,\beta$-dimethyl-$\gamma$-butyrolactone with ammonia to form (—)-$\alpha,\gamma$-dihydroxy-$\beta,\beta$-dimethylbutyramide.

6. dl-$\alpha,\gamma$-Dihydroxy-$\beta,\beta$-dimethylbutyramide, having a melting point of approximately 126–127° C.

7. (+)-$\alpha,\gamma$-Dihydroxy-$\beta,\beta$-dimethylbutyramide, having a melting point of approximately 94° C. and $[\alpha]^{25}_D$ of approximately $+52°$ in 2% methanolic solution.

8. (—)-$\alpha,\gamma$-Dihydroxy-$\beta,\beta$-dimethylbutyramide, having a melting point of approximately 94° C. and $[\alpha]^{25}_D$ of approximately $-52°$ in 2% methanolic solution.

ELMER J. LAWSON.
HERVEY C. PARKE.
LEON A. SWEET.

DISCLAIMER 2,358,337.—*Elmer J. Lawson*, Newtonville, N. Y., and *Hervey C. Parke* and *Leon A. Sweet*, Detroit, Mich. VITAMIN INTERMEDIATES AND THEIR PREPARATION. Patent dated Sept. 19, 1944. Disclaimer filed Oct. 16, 1946, by the assignee, *Parke, Davis & Company*.

Hereby enters this disclaimer to claims 4 and 7.

[*Official Gazette November 26, 1946.*]